United States Patent [19]
Myers

[11] Patent Number: 6,072,902
[45] Date of Patent: Jun. 6, 2000

[54] METHOD AND SYSTEM FOR COLOR MATCHING BETWEEN DIGITAL DISPLAY DEVICES

[75] Inventor: Robin D. Myers, Pleasanton, Calif.

[73] Assignee: Apple Computer, Inc., Cupertino, Calif.

[21] Appl. No.: 08/949,330

[22] Filed: Oct. 14, 1997

Related U.S. Application Data

[63] Continuation of application No. 08/433,733, May 3, 1995, abandoned.

[51] Int. Cl.[7] .................................................. G06K 9/00
[52] U.S. Cl. ......................... 382/167; 345/154; 348/661; 358/518
[58] Field of Search .................................. 358/518, 520, 358/523; 382/100, 162, 163–167; 345/154; 348/661

[56] References Cited

U.S. PATENT DOCUMENTS

| | | | |
|---|---|---|---|
| 4,751,535 | 6/1988 | Myers | 346/157 |
| 4,930,018 | 5/1990 | Chan et al. | 358/298 |
| 5,065,234 | 11/1991 | Hung | 358/80 |
| 5,539,540 | 7/1996 | Spaulding et al. | 358/518 |
| 5,612,902 | 3/1997 | Stokes | 702/85 |

*Primary Examiner*—Jon Chang
*Assistant Examiner*—Jayanti K. Patel
*Attorney, Agent, or Firm*—Burns, Doane, Swecker & Mathis, L.L.P.

[57] ABSTRACT

A method and system for matching color displayed by source and destination display devices and particularly for providing color matching between a computer monitor and an ink printer. The technique of the present invention initially determines the combination and color value ratios of single destination color components that will cause the destination device to display a color that essentially matches each of fully saturated single and dual colors of a source display device. These combinations of single destination color components and their corresponding color value ratios determine the best available blends of destination device color components for printing source device colors. A color matching algorithm is employed to derive the color value ratios—one for each of the single destination color components. Each color component ratio is then scaled and linearly interpolated over a range defined by the color matching algorithm to generate a set of look-up tables (LUTs)—one for each single destination color component. Color matching is performed by 1) performing a first series of computational steps to translate the source color value into an intermediate color value which is expressed in terms of single destination color components, 2) accessing the set of LUTs with the intermediate color value obtained in step 1 to obtain a second color value composed of the scaled linearly interpolated color values stored in the LUTs, and 3) optionally performing a second series of computational steps to translate the second color value into a color value which is expressed in terms of the original source color components.

4 Claims, 4 Drawing Sheets

STEP 1:
Print set of color squares

STEP 2:
Measure tristimulus values with colorimeter

STEP 3:
Use color matching algorithm to obtain closest matching printer color for each fully saturated single and dual monitor component colors

STEP 4:
Scale each combination component color ratio to match a chosen intensity scale and linearly extrapolate each ratio from zero to the maximum intensity value for the chosen intensity scale

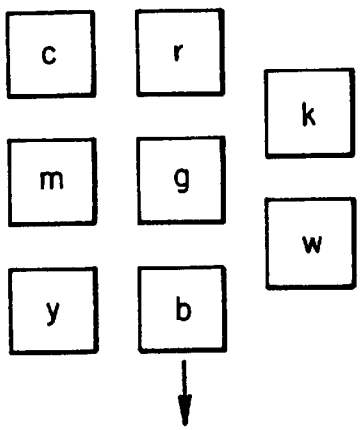

↓ COLORIMETER

↓ X Y Z tristimulus values

COLOR MATCHING ALGORITHM

↓ Printer component combination colors and corresponding ratios for each of the fully saturated single and dual monitor component colors

LOGIC UNIT

↓ Set of color tables for each of the printer colors

*FIG_1*

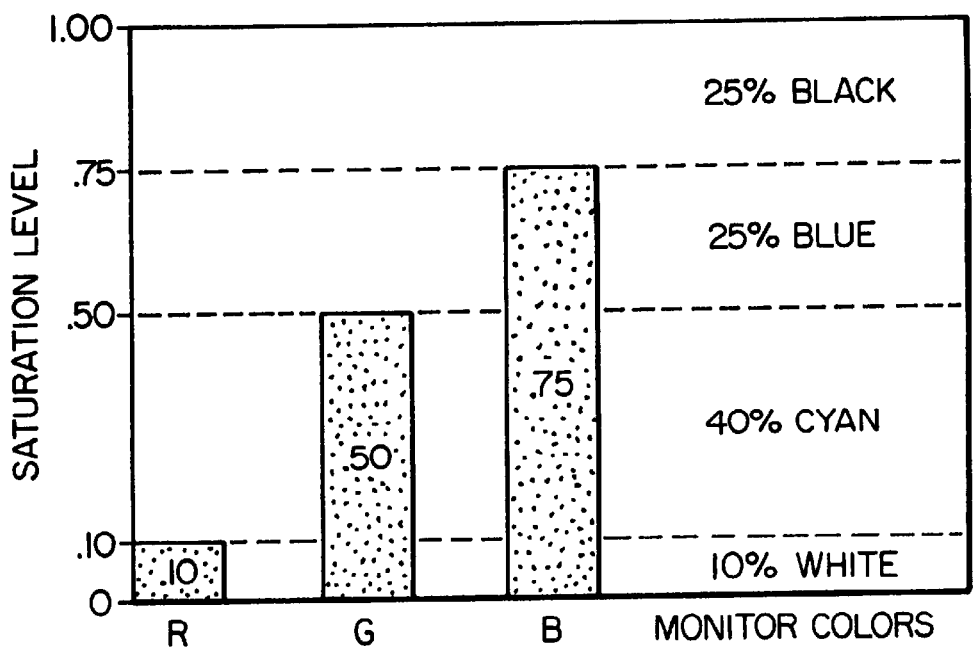
FIG_2
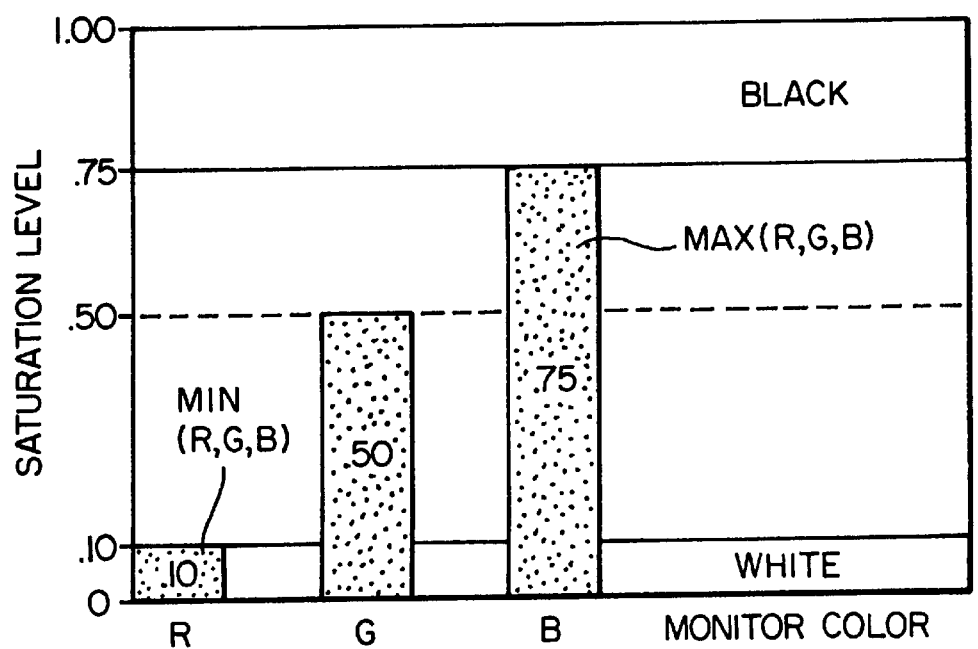
FIG_3A

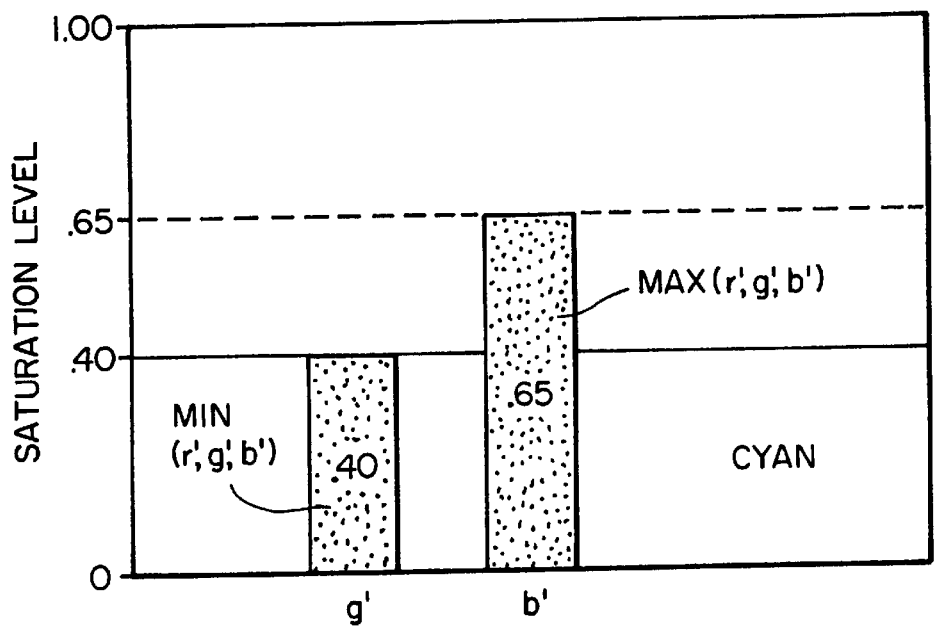
FIG_3B
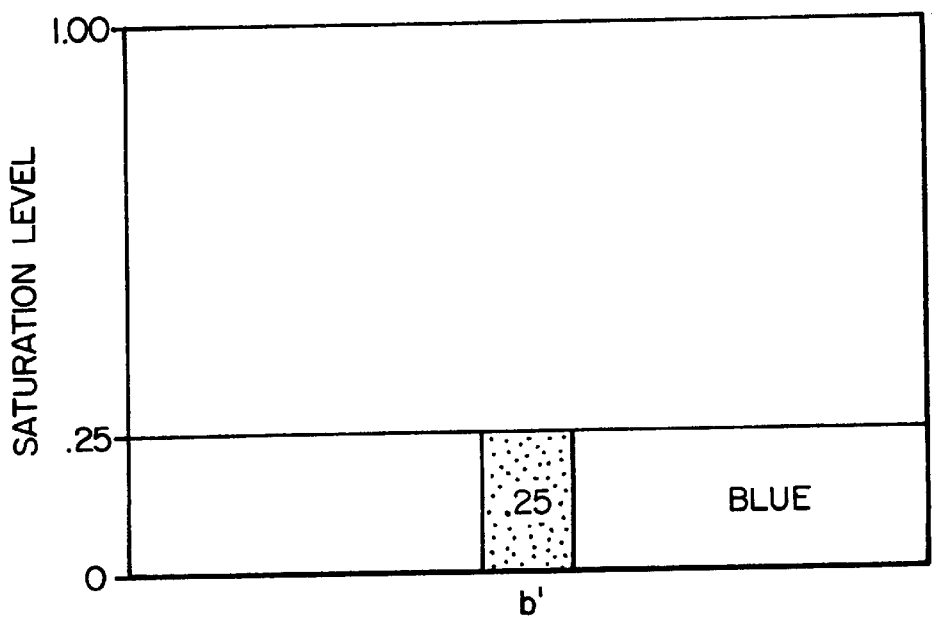
FIG_3C

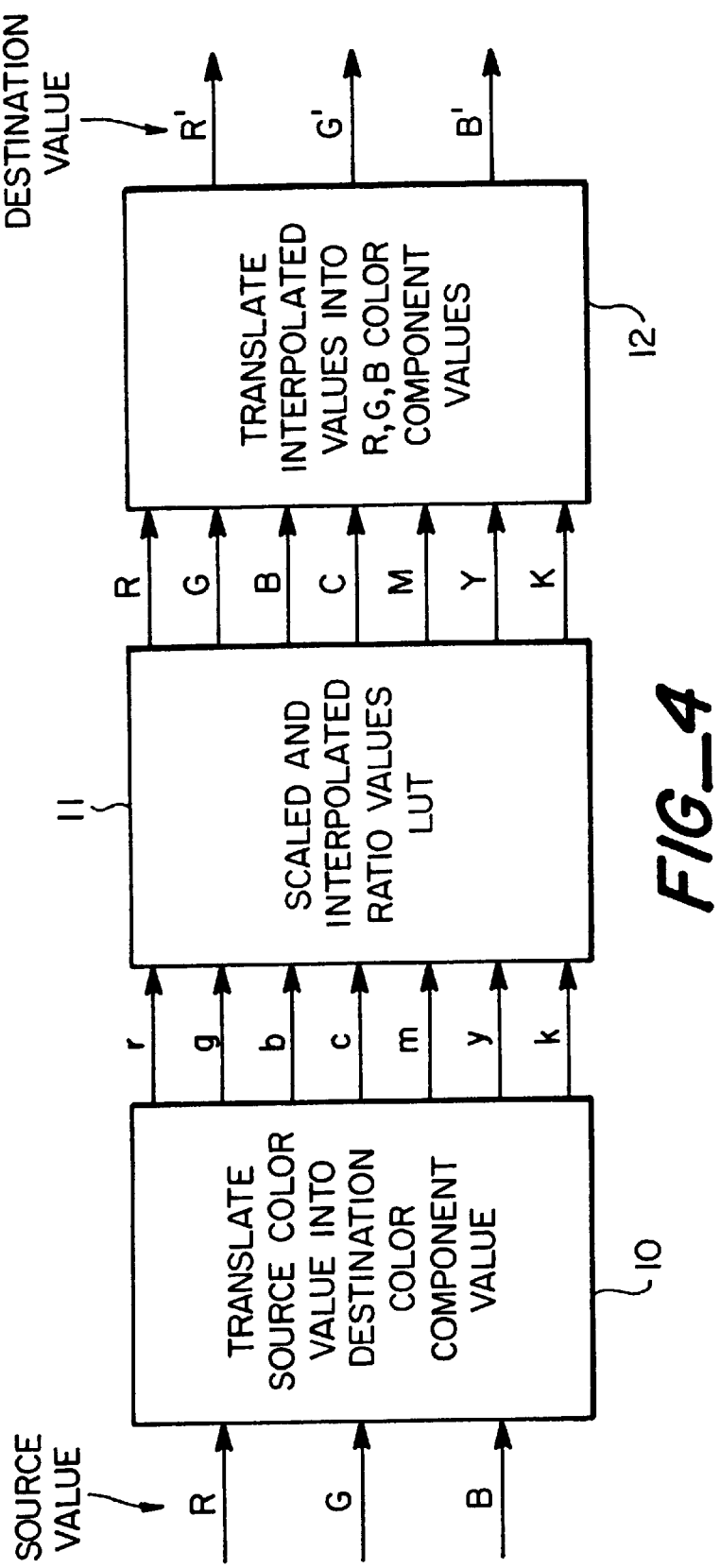
FIG_4

METHOD AND SYSTEM FOR COLOR MATCHING BETWEEN DIGITAL DISPLAY DEVICES

This application is a continuation of application Ser. No. 08/433,733, filed May 3, 1995, now abandoned.

FIELD OF THE INVENTION

The present invention relates to the field of color matching between I/O devices in a computer system and particularly to color matching between a monitor and a printer.

BACKGROUND OF THE INVENTION

The range of colors that a display device can print is defined as the color gamut of the device. The color gamut for a printer is different from that of a monitor. One reason for this is that the color gamut for a monitor is represented in digital red, green and blue (i.e. RGB) values which control the intensity of the monitor color phosphors producing a range of hues (e.g. red, green, blue, cyan, magenta etc.), lightnesses (i.e. how much white or black in the color) and saturations (i.e. how bright or intense the color is). In contrast, the printer is limited to the number of colors it can produce using its available inks arid their associated hues, lightnesses and saturations by a different process. Printer gamuts are often smaller than monitor gamuts. The colors that are the same for both gamuts are said to be in-gamut colors, whereas colors that are in one gamut but not the other are defined as out-of-gamut colors.

Color matching is a method that is used to match colors displayed by a source device (such as a monitor) to colors displayed by a destination device (such as a printer). Generally, the source device is defined as the device transmitting digital color information in the form of a digital color value and the destination device is the device receiving the color value. One manner in which color matching is performed is by using a color matching algorithm to calculate corrected color values to be inserted into a look-up table. Once a color table in created, color values transmitted from a monitor (typically RGB color values) are used to index the corrected values stored in the table. These corrected values are then transmitted to the printer and are used to instruct the printer what color it should print. The problem with this method is that creating the look-up tables is a very time intensive process due to the complexity of the algorithms used to generate the values to be stored in the look-up tables. In addition, the look-up tables generally take up large amounts of memory space.

Another problem with this type of color matching method is that different display devices often display colors in an inherently different manner. For example, a display monitor displays color by illuminating phosphor dots on its screen. The resulting color is the additive combination of the light from the phosphors. In contrast, a printer displays color by depositing ink on paper. The color is achieved by the ink's subtraction of light from the viewing illumination. Because of this, colors displayed on a monitor are additive whereas colors displayed on a printer are subtractive. Consequently, when monitor color components (e.g. red, green, and/or blue) are added to generate a third color the intensity of the resultant color is more intense than the two original colors. However, when more than one color is printed on paper with ink, each color is subtracted from the white viewing illumination and the resultant printer color is darker than each of the two color components that created it. As a result, a color value used to display color on a monitor screen will generate a darker color on a printer.

This problem becomes even more evident in the case in which a single component color value is used to display a color on a monitor and a multiple component color value is used to display a matching color on a printer. For instance, the monitor typically only needs to use a single component to display a fully saturated red, however in order for the printer to match this color, a color matching algorithm would often indicate that the printer needs to use two or three components, magenta, yellow and possibly black, to obtain a color that matches the monitor. The reason for this is that red on the printer is produced with two components, magenta and yellow, and as a result, the color will be darker. The inverse of the above case is also true—a printer can print a given color with a single component whereas the monitor needs to use two or more components to display that same color. For instance, printers can typically print cyans and magentas with a single component whereas a monitor must mix two components to generate these colors. As a result, the mixed monitor color is often lighter than the printed one component ink color.

Still another problem with color matching occurs when a monitor color falls out of the gamut of the printer (i.e. out-of-gamut colors). In this case, color matching algorithms often attempt to choose a printer color having a lightness, hue, and saturation close to that of the monitor color its being matched to. However, it is hard to match all three of these color characteristics due to the above described color display disparities between the monitor and the printer. As a result, color matching algorithms are sometimes designed to provide the same hue and lightness, but not the same saturation. The reason this is done is that, to the viewer, the lightness of a picture provides most of the information of the scene when compared to the saturation. However, although this is true for photos, where intense colors are not as critical, it is not true in other graphic display applications in which intensity (i.e. saturation) is important.

Thus, what is desired is an alternative color matching method to the presently used color matching algorithm techniques.

SUMMARY OF THE INVENTION

The present invention is a method and system for matching color displayed by source and destination display devices and particularly for providing color matching between a computer monitor and an ink printer. The technique of the present invention initially determines the combination of single destination color components and corresponding combination color value ratios that will cause the destination device to display a color that essentially matches the color associated with each of the fully saturated single color and dual color components of a source display device. These combinations of single destination color values and their corresponding color value ratios determine the best available blends of single destination device color components for printing each one of the single and double component fully saturated source device colors.

The ratios of the destination device components are derived by using a color matching algorithm. The color matching algorithm provides the closest matching combination of color components (with respect to hue and saturation, but ignoring lightness) that the destination device can display that corresponds to each of the fully saturated source device's single and dual color components. The color matching algorithm also provides percentage information about each of the color components in the combination.

The color component ratios are then used to create a set of color tables—one for each single destination device color component. The color values in each table are linearly scaled from zero to the maximum intensity level given by the color matching algorithm. The maximum intensity value in each color table corresponds to the previously obtained component ratio value for that color component. These tables are generated only once and are used to perform all subsequent color matching operations between the source and destination display devices unless the user decides to subjectively adjust colors by adjusting the original combination and ratio values.

Color matching is performed by first processing the source display device's original color value through a first series of computational steps that first subtracts out the white and black component color values encoded in the original source color value and then determines what combination and ratio of destination color components compose the original source color value. These computational steps generate single destination device component color values that represent the original source color value which are used to access the previously created color look-up tables. The accessed color values from the look-up tables are again processed so as to convert them into a color value compatible to the destination device.

In one specific embodiment of the present invention, the source display device is a monitor and the destination display device is a printer. In this embodiment combinational component color values associated with printer ink ratios are determined for each of the fully saturated RGB monitor colors using a given color matching algorithm. The ink ratios are used to generate the look-up color tables that are used for performing the color matching method of the present invention.

The color matching technique of the present invention can be implemented in a system that includes at least one logic unit for performing the computational steps that are performed on the original source color value before and after accessing the color look-up tables. The system also includes a memory unit for storing the previously created color look-up tables as described above. Finally, a computational unit is included to perform the computational steps necessary to convert the color look-up table values into destination device values.

BRIEF DESCRIPTION OF THE DRAWINGS

FIG. 1 illustrates the method of the present invention for generating a set of LUTs for each printer single color component.

FIG. 2 illustrates the steps performed to translate a source color value to express it in terms of a destination color value.

FIGS. 3A–3C illustrate the computational steps to translate a source color value into a destination color value.

FIG. 4 illustrates the system of the present invention for implementing the color correction method of the present invention.

DETAILED DESCRIPTION

A method and system for matching colors displayed by different display devices in a computer system is described. In the following description, numerous specific details are set forth, such as color value types, color matching algorithm techniques, color value bit width, etc., in order to provide a thorough understanding of the present invention. It will be obvious, however, to one skilled in the art that these specific details need not be employed to practice the present invention. In other instances, well-known computer system color hardware and operating systems have not been described in detail in order to avoid unnecessarily obscuring the present invention.

The method as described by the present invention is achieved by determining combinations and ratios of color components from a destination display device, such as a printer, that blend to display a color that essentially matches single and dual fully saturated color components displayed by a source display device. Once ratios of the combination color components are determined, the combined components may be blended at the same ratio as the single source components.

It should be understood that a single component color is defined as a color being made-up of a single color component. For example, in a monitor using RGB color components, each of the red, green, and blue colors constitute a single component color. Similarly, a dual component color is defined as a color being made-up of a combination of two of the single component colors. So in the case of a monitor, dual component monitor color cyan comprises green and blue monitor components, magenta is made-up of red and blue, and yellow is created by combining red and green. A fully saturated color corresponds to a color component being represented by its maximum color value. For example, a fully saturated blue might be represented by a digital binary number "11111111" (i.e. 255 in decimal). In this case, the color blue has 256 possible saturation levels from 0 (i.e. binary color value "00000000") to 255 (i.e. binary color value "11111111").

In order to implement the method of the present invention it is necessary to initially generate a set of color tables which are employed when performing the color matching method of the present invention. In comparison to prior art look-up tables (LUTs), the present invention's tables are easily and quickly generated and take-up very little memory space. By way of comparison, many prior art methods print many swatches of colors (as many as 1500) which are correspondingly matched to the monitor color gamut either empirically or with a color matching algorithm to generate values to be stored in color LUTs. The prior art LUTs typically store a corresponding printer color value match for a portion (but not all) of the monitor gamut colors. A typical monitor color gamut, using an 8-bit binary number to represent each of its three single color components (i.e. RGB), comprises $2^{24}$ possible color values. Thus, as can be imagined, even an abbreviated color LUT becomes cumbersome. Further, for values not stored in the LUT, a computational intensive color matching algorithm is used to generate one.

In contrast, the present invention's tables are generated by printing only a few color swatches—one swatch for each of the available printer inks (i.e. typically red, green, blue, cyan, magenta, yellow, and black). One color table is generated for each of the single color components of the destination device. In the case of the printer, the single color components correspond to each of the available printer inks. The typical ink colors that are available from printers are red, green, blue, cyan, magenta, yellow, and black (i.e. r,g,b,c,m,y,k). Thus, in the specific case of a printer, a separate table for each of the r,g,b,c,m,y,k colors is generated according to the method of the present invention. In other embodiments in which the destination display device uses different color components, the number of tables and the corresponding colors may vary.

The size of each table depends on the fully saturated source device color value. For instance, if the fully saturated source color value is equal to 255, then each table includes 256 color values ranging in saturation from 0 to 255 at unit increments. Thus, in the case in which a color table is generated for each of the seven r,g,b,c,m,y,k ink colors, only seven tables of 256 values, or approximately 4K bytes component color values are stored of the present invention. If each color value is comprised of an eight bit binary value, then approximately 36K bits of memory space is employed to store the set of LUTs of the present invention in which the destination device has seven single component colors.

FIG. 1 illustrates the technique of the present invention used to generate the set of LUTs. In step 1, a set of color squares is printed by the printer for each of the r,g,b,c,m,y,k single color components. The printed colors are fully saturated (i.e. the brightest hue that each can be achieved) with no white paper showing through. Each saturated single component color patch corresponds to one of the fully saturated single and dual source colors. Next, (step 2), a calorimeter is used to measure tristimulus values for each of the squares. The tristimulus values for a given color provide color information that defines the color's visual characteristics. The tristimulus values are typically defined in terms of a set of XYZ parameters. In the present example's case, tristimulus values for each of the r,g,b,c,m,y,k printed squares are measured—a total of seven sets of tristimulus values. After obtaining these values, each set is processed by a color matching algorithm. In other words, each of tristimulus values corresponding to each color patch is provided as input color values to the color matching algorithm. Note, if the given destination device is something other than a printer, the set of color squares are displayed in the manner inherent to the particular device and tristimulus measurements are taken from these displayed squares.

The color matching algorithm (step 3) performs two functions using the tristimulus values. First, it processes the tristimulus values obtained from the printed squares to provide a combination of destination single components. Each combination of the destination single color components corresponds to one of the fully saturated single and dual component source colors. For example, a set of tristimulus values corresponding to a fully saturated yellow color patch is processed by the color matching algorithm and yields a combination of the yellow and green destination single color components (assuming that the destination device single color components comprise red, green, blue, yellow, cyan, magenta and black). This combination of yellow and green destination single color components correspond to the fully saturated yellow dual component source color (assuming that the source single color components comprise red, green, and blue).

In addition to providing the combination of single destination color components, the color matching algorithm provides color value ratios of each of the single destination color components in each combination. Hence, the color matching algorithm processes each set of tristimulus values corresponding to each color patch to provide the closest matching destination color component combinations for each of the fully saturated single and dual component source colors. Table 1 shows single and dual fully saturated source colors and corresponding destination single color component combinations and ratios obtained by processing the measured tristimulus values with the color matching algorithm.

TABLE 1

| Fully Saturated Single and Dual Source Colors | Destination Device Single Component Ratios | |
| --- | --- | --- |
| Red | 98% Red | 2% Magenta |
| Green | 92% Green | 8% Yellow |
| Blue | 79% Cyan | 21% Blue |
| Cyan | 60% Cyan | 40% Green |
| Magenta | 48% Magenta | 52% Blue |
| Yellow | 32% Green | 68% Yellow |

Referring to Table 1 it can be seen that the given algorithm determined that to obtain the closest possible match to a fully saturated red, the destination device must actually display a combination color of 98% red and 2% magenta. For a fully saturated source cyan, which in the case of a monitor is actually a dual component color made-up of a fully saturated green with fully saturated blue, the color matching algorithm indicates that the closest matching destination color comprises a combination of 60% cyan and 40% green as shown in Table 1.

Once ratios are obtained for each dual and single source colors the color LUTs can be generated (step 4). In this particular example, the color values accessing the LUTs are represented as 8-bit binary numbers that range from a minimum value of 0 to a maximum value of 255.

In order to create the LUTs from the ratio values, the ratio values are first scaled to the range defined by the color matching algorithm and then linearly interpolated over that range. For instance, using Table 1 ratio values, the fully saturated monitor red corresponds to ratios of 98% red and 2% magenta. The 98% red ratio scaled to a value between 0–255 is approximately equal to 250 (i.e. 0.98×255). Thus the maximum value stored in the LUT corresponding to red is 250. Similarly the 92% scaled green ratio is equal to approximately 235 (i.e. 0.92×255).

Next, the scaled ratios are linearly interpolated over the range of 0–255. For instance, for the values shown in Table 1, a ratio value of 50% red corresponds to $$\frac{50\%}{98\%} \times 255 = 130.$$

A LUT is created for each of the single destination device components.

The LUTs are used when implementing the color matching method and system of the present invention. In one embodiment of the present invention the method is implemented by performing three general steps:

1) translate the source color value so as to express it in terms of destination component values;
2) access the previously created LUTs with the destination component values determined in step 1;
3) recombine the accessed values from step 2 so as to express the accessed color value in terms of compatible color value information for the destination device.

In one embodiment of the present invention, the following steps are performed to translate the monitor color value into a color value composed of printer components (where, initially, the monitor value is expressed in terms of R,G,B values each having a range of 0–1). It should be understood that the R,G,B values may alternatively be expressed in terms of 8-bit binary values.

The first step to translating a monitor RGB color value is to determine the maximum (i.e. Max(RGB)) and minimum (i.e. Min(RGB)) color component values. Next, the amount of black and white encoded in the RGB color value is determined. The amount of white color value encoded in the monitor color value corresponds to the minimum component color value (i.e. Min(RGB)) as indicated below in equation 1.

$$\mathrm{Min}(RGB) = \text{white color value} = w \qquad \text{eq. 1}$$

The reason for this is easily illustrated in an example shown in FIG. 2. FIG. 2 shows an RGB monitor color having 0.75 blue, 0.50 green, and 0.10 of red. Since combining all of the colors on a monitor displays white, then 0.10 of each of the blue, green and red color components contributes to display white. Thus, 0.10 of white is encoded in the monitor color value and the color value corresponding to the minimum component corresponds to the white color value encoded in the RGB value.

To determine the encoded black component in the RGB value the Max(R,G,B) is subtracted from the maximum component range value (i.e. 1) as shown by equation 2:

$$1 - \mathrm{Max}(R, G, B) = \text{black color value encoded in source color value} \qquad \text{eq. 2}$$

In other words, since black in the monitor indicates no color at all and if the maximum component value (i.e. Max(R,G,B)) is less than the possible maximum component value, the difference between the two equals the amount of black encoded in the RGB color value. This is illustrated in FIG. 2. In this case Max(R,G,B) is equal to 0.75 of blue. Thus, since blue is not at full intensity, a 0.25 black color value is encoded in the RGB monitor color value.

The next step is to eliminate the encoded white color component from the RGB color value. In the example shown in FIG. 2, since 0.10 of each color combines to form white, this portion is subtracted off (shown in equations 3–5 below).

$$r' = R - w \qquad \text{eq. 3}$$

$$g' = G - w \qquad \text{eq. 4}$$

$$b' = B - w \qquad \text{eq. 5}$$

Next, the remaining intermediate r', g', b' monitor values are evaluated to determine a maximum and a minimum value (i.e. Max(r', g', b') and Min(r', g', b')) and then the following subtractions are performed to determine the remaining component color values for each of the destination components. Specifically, these steps determine the amount of the two component colors encoded in the RGB values (e.g. the amount of yellow encoded in an orange color).

if Max(r', g', b') = r', then: eq. 6

$m = b'$
$y = g'$
$r = r' - (g' + b')$
$c = 0$
$g = 0$
$b = 0$ else if Max(r', g', b') = g', then: eq. 7

$m = 0$
$y = r'$
$r = 0$
$c = b'$
$g = y' - (r' + b')$
$b = 0$ else if Max(r', g', b') = b', then: eq. 8

$m = r'$
$y = 0$
$r = 0$
$c = g'$
$g = 0$
$b = b' - (r' + g')$

A visual example of the computational steps defined by equations 3–8 is illustrated in FIGS. 3A–3C. FIG. 3A illustrates a color as defined in monitor color components, comprising 0.75 blue, 0.50 green, and 0.10 red. Using equations 1 and 2, Min(R,G,B)=w=0.10 and Max(R,G,B)= 0.75, indicating that the monitor color value has 0.25 of a black component and 0.10 of a white component encoded into it.

Subtracting the white component value from each of the source RGB colors (equations 3–5) leaves 0.40 green (i.e. g'=0.40) and 0.65 blue (i.e. b'=0.65) as shown in FIG. 3B. Next, Max(r',g',b') and Min(r',g',b') are determined. In FIG. 3B, Max(r',g',b')=b'=0.65 and Min(r',g',b')=g'=0.40. Since combining green and blue creates cyan, then 0.40 of the 0.65 of blue combines with 0.40 of the green to create 0.40 of cyan, leaving 0.25 blue (FIG. 3C). Using equations 6–8, since Max(r',g',b')=b'=0.65, then m=r', y=0, r=0, c=g'=0.40, g=0, and b=b'-Max(r',g')=0.65-0.40 =0.25 (FIG. 3C). Thus, the color shown in FIG. 3A comprises 0.10 white, 0.25 black, 0.40 cyan and 0.25 blue.

These r,g,b,c,m,y,k values can now be used to access the previously created set of LUTs. The LUTs provide R,G,B, C,M,Y,K color values that when transmitted to the printer blend to print a color that matches the monitor. Often, the standard color data information used in display device image processing programs is RGB color values. Consequently, in an embodiment of the present invention, the R,G,B,C,M,Y,K color values need to be translated for the printer. This step is accomplished by performing the reverse of the computational steps as described in equations 3–8 as indicated below:

if Max(r', g', b') = r' then eq. 9

$R' = \text{red LUT}_R(r) + \text{magenta LUT}_R(m) + \text{yellow LUT}_R(y)$
$G' = \text{red LUT}_G(r) + \text{magenta LUT}_G(m) + \text{yellow LUT}_G(y)$
$B' = \text{red LUT}_B(r) + \text{magenta LUT}_B(m) + \text{yellow LUT}_B(y)$ -continued else if Max(r', g', b') = g' then  eq. 10

$R'$ = green LUT$_R$(r) + cyan LUT$_R$(c) + yellow LUT$_R$(y)

$G'$ = green LUT$_G$(r) + cyan LUT$_G$(c) + yellow LUT$_G$(y)

$B'$ = green LUT$_B$(r) + cyan LUT$_B$(c) + yellow LUT$_B$(y)

else if Max(r', g', b') = b' then  eq. 11

$R'$ = blue LUT$_R$(b) + cyan LUT$_R$(c) + magenta LUT$_R$(m)

$G'$ = blue LUT$_G$(b) + cyan LUT$_G$(c) + magenta LUT$_G$(m)

$B'$ = blue LUT$_B$(b) + cyan LUT$_B$(c) + magenta LUT$_B$(m)

$R' = R' + w$  eq. 12

$G' = G' + w$  eq. 13

$B' = B' + w$  eq. 14 where red LUT, green LUT, blue LUT, cyan LUT, magenta LUT, yellow LUT are the pseudo-ink look-up tables each containing three values (R,G,B,) corresponding to the destination device RGB values; and where the expression "red LUT$_R$(r)" accesses the red component of the value stored in the red LUT at address location (r); "red LUT$_G$(r)" accesses the green component of the value stored in the red LUT at location (r); and "red LUT$_B$(r)" accesses the blue component of the value stored in the red LUT at the location indicated by (r).

FIG. 4 illustrates the system of the present invention for performing the color correction method of the present invention. As shown in FIG. 4 a first logic unit 10 functions to translate the source RGB value into r,g,b,c,m,y,k values. In other words it performs the computational algorithm as defined by equations 3–8. These r,g,b,c,m,y,k values are used to access the LUTs 11. The LUTs provide the corresponding corrected destination values in terms of R,G,B,C,M,Y,K values. Finally the R,G,B,C,M,Y,K values are converted into R',G,'B' values by logic unit 12 by performing the reverse operations performed by logic unit 10. It should be understood that if the destination device (i.e. printer accepts the R,G,B,C,M,Y, K values directly from the LUTs, then logic block 12 is not required).

It should also be understood that although examples have been described in conjunction with a monitor and printer, the concept of the present invention may be applied to other source and destination devices.

Although the elements of the present invention have been described in conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

I claim:

1. A method of displaying a first color on a source display device that essentially matches a second color displayed on a destination display device, wherein said source device is a monitor and said destination device is a printer, and wherein said first color has an associated first color value composed of red, green, and blue (RGB) source color components and said second color has an associated second color value composed of red, green, blue, cyan, magenta, yellow and black (R,G,B,C,M,Y,K) single destination color components, said method comprising the steps of:

determining a combination and ratio of color values of single destination color components corresponding to each of fully saturated single and dual source component color values, each of said combination and ratio of color values of said destination components corresponding to a color displayed by said destination device that provides the closest color match with respect to hue and saturation to said each fully saturated source single and dual component color values displayed on said source device;

generating a set of look-up tables (LUTs), one LUT corresponding to each of said single destination color components using said ratio of color values, by:

scaling each of said ratio of color values to a given range, said range having an associated maximum color value and minimum value;

linearly interpolating each of said ratio of color values over said given range to generate a set of linearly interpolated color values, each of said set of interpolated color values corresponding to one of said single destination color components;

storing said each set of interpolated color values into a storage means; using said set of LUTs to perform color matching between said first color and said second color by:

translating said first color value so as to express it in terms of an intermediate color value composed of single destination color components, wherein said intermediate color value is composed of said single destination color components r,g,b,c,m,y,k, and w each having corresponding color values;

accessing said storage means with said intermediate color value, wherein said storage means outputs said second color value, said second color value being composed of said linearly interpolated color values;

wherein said step of translating said first color value so as to express it in terms of said intermediate color value comprises the following steps:

evaluating said first color value to determine a minimum source component color value (Min(RGB)) and a maximum source component color value (Max (RGB)) wherein, Min (RGB) is equal to a white component color value (w), and wherein said white component color value is a first component of said intermediate color value;

determining a black component color value (k) in said first color value wherein, k is equal to a fully saturated source single component color value minus Max(RGB), wherein said black component color value is a second component of said intermediate color value;

determining color values r', g', and b' wherein, $r' = R - w$ $g' = G - w$ $b' = B - w;$ determining a maximum r', g' and b' (Max(r',g',b')) value and a minimum r', g', and b' value (Min(r',g', b'));

determining remaining components of said intermediate color value wherein, if Max(r',g',b')=r', then:

m=b' y=g' r=r'−Max(g',b')=r'−(g'+b')

$c=0$ $g=0$ $b=0$ else if Max(r'g'b')=g', then:

$m=0$ $y=r'$ $r=0$ $c=b'$ $g=g'-\text{Max}(r,b)=g'-(r'+b')$ $b=0$ else if Max(r'g'b')=b', then:

$m=r'$ $y=0$ $r=0$ $c=g'$ $g=0$ $b=b'-\text{Max}(r,g)=b'-(r'+g')$.

2. The method as described in claim 1 wherein further including the step of translating said second color value to express it in terms of RGB color components.

3. A system for implementing the method as described in claim 2 comprising:

a first logic means for translating said first color value so as to express it in terms of said intermediate color value;

said storage means for storing said set of scaled interpolated color values, said intermediate color value for accessing said linearly interpolated color values;

a second logic means for translating said second color value so as to express it in terms of said RGB color components.

4. The system as described in claim 3 wherein the method of translating said second color value so as to express it in terms of said RGB color components comprises the following steps:

1) determining said RGB color component values in each of said linearly interpolated color values;
2) adding said red color component color values corresponding to said each linearly interpolated color values;
3) adding said blue color component color values corresponding to said each linearly interpolated color values;
4) adding said green color component color values corresponding to said each linearly interpolated color values;
5) adding said white color component to the added red color components from steps 2–4 to obtain said red color component value of said translated second color value, adding said white color component to the added blue color components from steps 2–4 to obtain said blue color component value of said translated second color value, and adding said white color component to the added green color components from steps 2–4 to obtain said green color component value of said translated second color value.

* * * * *